May 19, 1964 — M. W. WOLFE — 3,133,587
TIRE REPAIR ELEMENT
Filed Nov. 15, 1962

INVENTOR.
MERRITT W. WOLFE
BY
J.B. Holden
ATTORNEY

United States Patent Office 3,133,587
Patented May 19, 1964

3,133,587
TIRE REPAIR ELEMENT
Merritt W. Wolfe, Akron, Ohio, assignor to The Goodyear Tire & Rubber Company, Akron, Ohio, a corporation of Ohio
Filed Nov. 15, 1962, Ser. No. 237,918
5 Claims. (Cl. 152—367)

This invention relates to a tire repair patch and, more particularly, to a repair element utilized in reinforcing or repairing the ruptured portion of a tire casing. The invention has to do specifically with a patch for repairing injured pneumatic tire casings which includes a plurality of ply members disposed in superposed relationship and coupled with an underlying layer of unvulcanized rubber which is adapted to be placed over the injury in the tire carcass, then vulcanized in position, thus becoming an integral part of the tire casing.

Certain prior repair patches are composed of a plurality of layers, each containing parallel cord reinforcement associated with a layer of rubber to hold them together. It is common in the art to orientate the reinforcement plies in crossed relationship with one another, then position the patch so that the cords therein extend in substantially the same direction as the cords in the tire casing. Furthermore, it is also common to place additional transverse reinforcement strips over the edge where the cord ends terminate in an attempt to reduce fatigue cracking at the discontinuity.

The importance of preventing cracks from occurring at the edge of the tire repair patches is particularly important with the advent of the two-ply tire such as those utilized on trucks. The two-ply tire utilizes larger cords and is designed to flex a greater extent under normal operating conditions. The repair patches for the large cord tires require larger than normal cords capable of carrying correspondingly larger loads. Transmitting the load to and from the large cord patch also necessitates a better distribution of the stress concentration at the cord ends. Because of the greater cord diameter there exists a greater discontinuity at the cord end; therefore, it is very beneficial to reduce the overall thickness of cord reinforcement without impairing its load-carrying capabilities.

The primary object of this invention is to provide a tire repair patch with the reinforcement cords so orientated that fatigue cracking along the edges of the patch is eliminated or greatly reduced.

Another object of the invention is to provide a tire repair patch of the type indicated in which the tensile and compressive stresses at the edge of the patch are minimized, thus increasing the life of the tire repair.

An additional object of the present invention is to increase the bonding surface at the cord ends within the patch, thus reducing the load per unit length of patch edge.

A further object of the invention is to provide a tire repair patch wherein the reinforcement cord ends are spread out, thus providing a greater range of patch orientation with respect to the cords within the tire casing.

Further and more specific objects will be apparent from the description taken in connection with the accompanying drawings, in which FIG. 1 shows in plan view a repair patch with untwisted cord ends;

Figure 1:
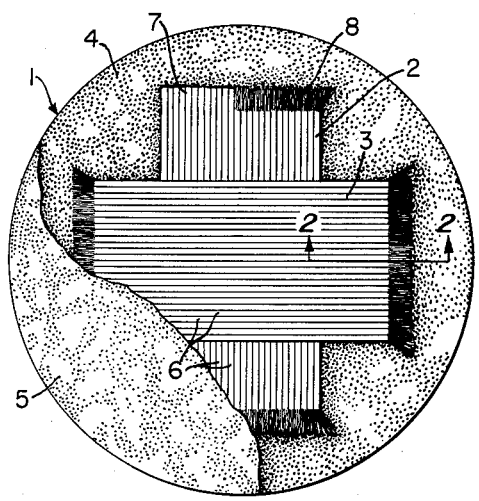
Figure 2:
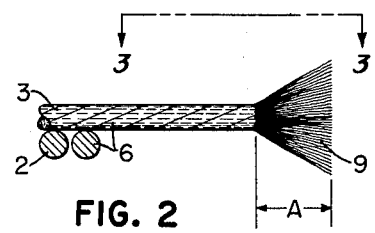
FIG. 2 is an enlarged view taken along lines 2—2 of FIG. 1 and showing the untwisted cord ends.

Referring to FIG. 1 of the drawings, a repair patch 1 is constructed from a plurality of plies such as 2 and 3 that are sandwiched between layers of gum stock 4 and 5. Each ply contains reinforcement cords 6 in parallel orientation. The ends of the reinforcement cords ordinarily end as shown at 7; however, it has been discovered that it is desirable to fray or untwist the ends of the reinforcement cords as shown at 8. The cord ends are frayed along their length for 10 to 20 cord diameters. The fraying is more than a mere untwisting of the cord ends. In an untwisted cord the individual filaments still retain their initial helical configuration that was imparted during the original fabrication. The fraying of the cord ends tends to destroy the original helical configuration of each filament so that they are predominantly straight. As the twist of the filaments is destroyed, they will spread out as will be more fully described hereinafter. FIG. 2 shows an enlarged view taken along the lines 2—2 in which the gum stock layers 4 and 5 have been removed for clarity. The cord ends 9 are subjected to a brushing and combing operation that untwists the cord strands and removes practically all the original helical twist. The fraying can be accomplished by subjecting the cord ends to a revolving wire brush or can be crushed by passing the patch edge through the teeth of a set of right angle bevel gears. As has been heretofore stated, the preferred length of frayed cord edge is 10 to 20 cord diameters as shown by dimension A in FIG. 2.

Figure 3:
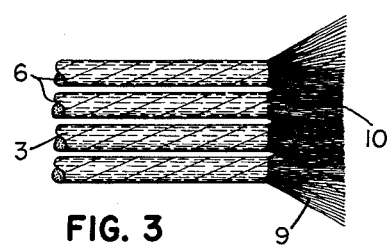
FIG. 3 is a further enlarged plan view taken along lines 3—3 of FIG. 2.

FIG. 3 is a section taken along lines 3—3 of FIG. 2 that shows how the frayed cord ends overlap each other, thus providing a brush-like patch edge 10. The cord filaments will not intermesh in the desired manner unless the cord ends are frayed until the residual twist is removed.

Figure 4:
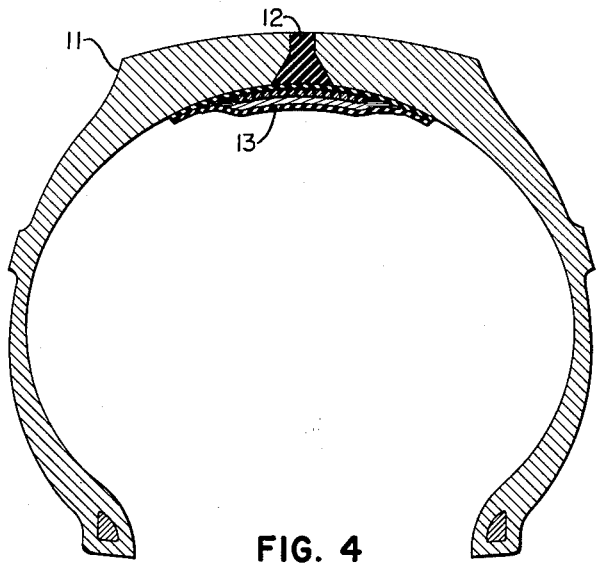
FIG. 4 shows a portion of a tire partly in section with a repair made with the patch of this invention.

FIG. 4 shows a section of a tire carcass 11 that contains a rubber repair plug 12 installed by conventional methods. The interior of the carcass is reinforced with a patch 13 containing frayed reinforcement cord ends. Patch 13 is bonded so that it adheres to plug 12 and to the carcass cords adjacent the ruptured area.

Figure 5:
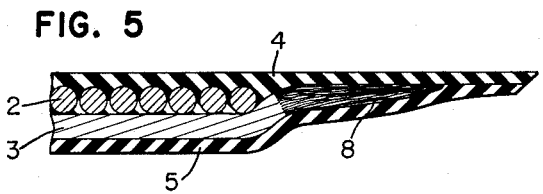
FIG. 5 is an enlarged cross section of the patch which shows more distinctly the tapering of the untwisted cord ends.

FIG. 5 is an enlarged cross sectional view showing a portion of patch 13. Cords 2 are shown in section and cords 3 terminate with frayed ends 8. Ends 8 can taper to en edge that is thinner than the untwisted cord thickness because the filaments expand, thus occupying the space existing between individual cords. In addition, the filaments can expand laterally, thus covering an area greater than the ordinary edge containing cut cords.

Figure 6:
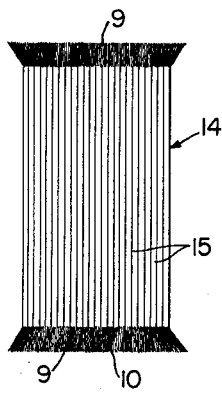
FIG. 6 shows a plan view of another embodiment in which the cord ends are untwisted.

FIG. 6 shows a plan view of another embodiment in which the cord ends are untwisted. Patch 14 is made entirely of parallel cords 15 which terminate with frayed or untwisted ends as heretofore described. The unilateral strength characteristics of patch 14 are particularly desirable in a tire reinforced entirely from radially aligned cord plies. The absence of transverse cords permits the patch to flex simultaneously with the tire carcass, thus minimizing edge failure at the sides of the patch.

As pointed out before, the frayed edges of the reinforcement cords spread the load carried by the patch over a greater area, thus reducing the load per inch of the patch edge. The frayed cord edges are more pliable, thus resulting in less bending movement at the patch edge. Also, the reduced thickness of the frayed reinforcement cords reduces the force couple that exists at the discontinuity between patch edge and tire carcass.

While certain representative embodiments and details have been shown for the purpose of illustrating the invention, it will be apparent to those skilled in this art that various changes and modifications may be made therein without departing from the spirit or scope of the invention.

I claim:

1. A tire repair patch having reinforcement cord therein, the ends of said cord being untwisted and spread transversely with respect to the longitudinal cord direction so that the edge of the patch decreases in thickness and has an increased bonding area.

2. A tire repair patch as claimed in claim 1 in which the untwisted end portion extends longitudinally along said cord ends for a distance between 10 and 20 cord diameters.

3. A tire repair patch as claimed in claim 2 wherein the untwisted filaments from one cord end intermingle and overlap the filaments of contiguous cord ends.

4. A tire repair patch as claimed in claim 3 in which the untwisted filaments are essentially straight.

5. In combination a tire containing a ruptured area and a repair patch vulcanized thereon, said patch comprising a plurality of layers of rubber-coated reinforcement cord, the ends of which are untwisted until the filaments therein are essentially straight to form an edge tapering in thickness and transversely spread to increase the bonding surface.

References Cited in the file of this patent

UNITED STATES PATENTS

| | | |
|---|---|---|
| 1,903,406 | Putvin | Apr. 4, 1933 |
| 3,004,580 | Chambers et al. | Oct. 17, 1961 |